United States Patent
Sunohara et al.

(10) Patent No.: US 6,964,166 B2
(45) Date of Patent: Nov. 15, 2005

(54) HYDRAULIC MASTER CYLINDER FOR VEHICLE

(75) Inventors: Hidemitsu Sunohara, Nagano (JP); Akihiro Rokugawa, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 38 days.

(21) Appl. No.: 10/751,648

(22) Filed: Jan. 6, 2004

(65) Prior Publication Data

US 2004/0194462 A1 Oct. 7, 2004

(30) Foreign Application Priority Data

Jan. 6, 2003 (JP) ............ P. 2003-000697
Jan. 8, 2003 (JP) ............ P. 2003-002367

(51) Int. Cl.[7] ............................................ B60T 11/16
(52) U.S. Cl. ............................... 60/585; 92/165 R
(58) Field of Search ................. 60/562, 585, 588; 92/165 R (56) References Cited

U.S. PATENT DOCUMENTS

| | | |
|---|---|---|
| 5,187,934 A | 2/1993 | Mori |
| 5,207,061 A * | 5/1993 | Kosarski, Jr. ............... 60/562 |
| 6,000,220 A * | 12/1999 | Simon Bacardit ........... 60/562 |
| 6,012,288 A * | 1/2000 | Gualdoni et al. ............ 60/562 |
| 6,460,336 B1 * | 10/2002 | Desbois et al. .............. 60/585 |

FOREIGN PATENT DOCUMENTS

| | | |
|---|---|---|
| DE | 195 37 038 A1 | 4/1997 |
| EP | 0 169 560 A2 | 1/1986 |
| EP | 1 046 561 A2 | 10/2000 |
| JP | 8-2002 | 1/1996 |
| JP | 10-59161 | 3/1998 |
| WO | WO 93/16905 | 9/1993 |

OTHER PUBLICATIONS

European Search Report dated May 5, 2004.

* cited by examiner

*Primary Examiner*—Thomas E. Lazo
(74) *Attorney, Agent, or Firm*—Greenblum & Bernstein, P.L.C.

(57) ABSTRACT

A hydraulic master cylinder for vehicle has: a cylinder main body; a sleeve; a plurality of seal rings; a plug, a lid member comprising the sleeve and the plug; and a piston inserted into the cylinder bore so as to form a hydraulic pressure chamber between the piston and the lid member; wherein the sleeve is inserted into the cylinder main body with an open end thereof being made to face an interior of the cylinder main body so as to dispose the seal rings between a circumferential wall of the cylinder bore and the sleeve and in such a manner that the seal rings hold the outlet port therebetween, and the plug is fixedly threaded in the opening at the one end so as to prevent the dislocation of the sleeve.

19 Claims, 7 Drawing Sheets

HYDRAULIC MASTER CYLINDER FOR VEHICLE

BACKGROUND OF THE INVENTION

1. Field of the Invention

The present invention relates to a hydraulic master cylinder for vehicle adapted to hydraulically actuate brakes and clutches of automobiles and two- and three-wheeled automotive vehicles, and more particularly to a hydraulic master cylinder in which an opening at one end of a cylinder main body which is made to open at both ends thereof is closed with a lid member so as to form a cylinder bore.

The present invention relates to a hydraulic master cylinder for vehicle adapted to hydraulically actuate brakes and clutches of automobiles.

2. Description of the Related Art

Among conventional hydraulic master cylinder for vehicle, there is a hydraulic master cylinder for vehicle in which a lid member is mounted in an opening at one end of a cylinder main body which is made to open at both ends thereof so as to form a cylinder bore. For example, in a plunger hydraulic master cylinder, a lid member is mounted in an opening at one end of a cylinder main body, and a piston guide is mounted in an interior of the cylinder main body, whereby a cylinder bore is formed therein. A primary piston and a secondary piston are inserted into the cylinder bore, and a primary hydraulic chamber and a secondary hydraulic chamber are defined between the two pistons and between the secondary piston and the lid member, respectively.

The lid member includes a cylindrical portion and a flange portion which are formed integrally, the cylindrical portion being adapted to be inserted into the cylinder main body and the flange portion being adapted to cover one end portion of the cylinder main body. A threaded portion is provided on an outer circumference of a distal end of the cylindrical portion and on an inner circumference of the cylinder main body, respectively, and an output port which communicates with a discharge port in the cylinder main body is formed rearward of the threaded portions. A seal ring is fitted on the distal end of the cylindrical portion and near the flange portion, and by screwing the distal end of the cylindrical portion into the cylinder main body, the lid member is mounted in the cylinder main body (for example, refer to JP-UM-B-8-2002 Pages 1 to 2, FIG. 1).

In the aforesaid hydraulic master cylinder for vehicle, however, in mounting the lid member in the cylinder main body, since the seal ring is screwed into the cylinder main body while being revolved, the seal ring is twisted, which may lead to a risk that the durability is deteriorated.

In addition, when a hydraulic pressure is generated in the secondary hydraulic pressure chamber, the seal ring provided near the flange portion is subjected to a hydraulic pressure from a working fluid which has oozed out into a gap between a flange side of the lid member which is not in threaded engagement with the cylinder bore and the cylinder bore. Due to this, there needs to provide at the distal end of the cylindrical portion a sufficient length of threaded portion which is threaded into the cylinder bore so as to prevent the dislocation of the lid member from the cylinder bore.

Furthermore, in mounting and dismounting the lid member in and from the cylinder bore, while a tool hole is formed in a bottom wall of the lid member, dust and mud collect in the tool hole to clog it up therewith, this leading from time to time to a risk that a tool cannot be inserted into the tool hole so clogged.

In a plunger master cylinder which is one of master cylinders, an opening at one end of a through bore formed in a cylinder body is closed by a lid member so as to form a bottomed cylinder bore, a cylindrical piston guide is fitted into the cylinder bore, a piston is slidably inserted into the piston guide so that a hydraulic pressure chamber is defined between the piston and a bottom portion of the cylinder bore, a cup seal having an outer circumferential lip portion which resiliently contacts an inner wall of a cylinder bore, an inner circumferential lip portion which resiliently contacts an outer wall of a piston and a base portion which couples both the lip portions together at rear ends thereof is disposed within the cylinder bore with both the lip portions being made to face the hydraulic pressure chamber, and the cup seal is held by a piston guide which enters a recessed portion between the lip portions.

Working fluid supply holes which open communications between a reservoir and the hydraulic pressure chamber are formed in the piston guide and the piston, respectively, and in conjunction with the movement of the piston towards the hydraulic pressure chamber side, when the working fluid supply holes in the piston are closed by the cup seal, the communication between the hydraulic pressure chamber and the reservoir is cut off, and when the piston moves further towards the hydraulic pressure chamber, the pressure within the hydraulic pressure chamber is increased. As this occurs, both the lip portions of the cup seal increase their press contact forces against the inner wall of the cylinder bore and the outer wall of the piston, respectively, in association with the increased in pressure within the hydraulic pressure chamber. Then, when something like a negative pressure is generated within the hydraulic pressure chamber as the piston moves backwards, the working fluid on the reservoir side deflects both the lip portions of the cup seal, so that the working fluid is supplied into the hydraulic pressure chamber (for example, refer to JP-A-10-59161 Pages 2 to 6, FIGS. 1 to 9).

In the cup seal holding structure described above, however, since an outside of the inner circumferential lip portion is press held towards the outer wall of the piston, the resilient contact force of the inner circumferential lip portion against the piston outer wall is increased, and when the piston moves, there is caused a risk that the inner circumferential lip portion is bitten into the working fluid supply holes, and in addition, since the cup seal is press held only towards the outer wall of the piston, the cup seal moves in conjunction with the movement of the piston, and an ineffective stroke of the piston is increased.

SUMMARY OF THE INVENTION

Then, a first object of the present invention is to provide a hydraulic master cylinder for vehicle which can prevent a seal ring from being twisted when the seal ring is mounted in a cylinder main body so as to improve the durability of the seal ring, which can reduce the length of a threaded portion of a lid member which is threaded into the cylinder main body while ensuring a proper mounting of the lid member in the cylinder main body so as to reduce the length of the cylinder main body that is formed, and which can prevent the dislocation of the lid member from the cylinder main body and collection of dust and mud on the lid member even if the lid member is loosened.

Then, a second object of the present invention is to provide a hydraulic master cylinder for vehicle in which the cup seal is fixedly held within the cylinder bore so as not to move in conjunction with the movement of the piston to thereby reduce the ineffective stroke of the piston.

With a view to attaining the first objects, according to a first aspect of the present invention, there is provided a hydraulic master cylinder for vehicle having: a cylinder main body opening at both ends thereof and including a discharge port; a bottomed cylindrical sleeve inserted into the cylinder main body and including an outlet port for a working fluid communicating with the discharge port; a plurality of seal rings for sealing a periphery of the outlet port fluid tightly; a plug having a threaded portion on an outer circumference thereof, a lid member comprising the sleeve and the plug, and mounted via the seal rings in an opening at one end of the cylinder main body so as to form a bottomed cylinder bore; and a piston inserted into the cylinder bore so as to form a hydraulic pressure chamber between the piston and the lid member; wherein the sleeve is inserted into the cylinder main body with an open end thereof being made to face an interior of the cylinder main body so as to dispose the seal rings between a circumferential wall of the cylinder bore and the sleeve and in such a manner that the seal rings hold the outlet port therebetween, and the plug is fixedly threaded in the opening at the one end so as to prevent the dislocation of the sleeve.

In addition, the plurality of seal rings may be O rings having the same diameter, a cover member for covering the plug may be mounted on one end portion of the cylinder main body, the cover member may be formed integrally with a reservoir mounted on the cylinder main body for storing a working fluid, a hexagonal hole may be opened in a central portion of the plug for insertion of a tool.

With a view to attaining the second object, according to the present invention, there is provided a hydraulic master cylinder for vehicle as set forth in the first aspect, further having: an annular cup seal disposed within the cylinder bore and having an outer circumferential lip portion resiliently contacting an inner wall of the cylinder bore, an inner circumferential lip portion resiliently contacting an outer wall of a piston and a base portion coupling both the lip portions together at base portions thereof; the plurality of raised portions disposed circumferentially on the base portion; a piston guide entering a recessed portion between the lip portions of the cup seal; wherein the cup seal is held within the cylinder bore with a plurality of raised portions being in abutment with an end face of the piston guide.

In addition, the plurality of raised portions may be disposed at positions closer to the inner circumferential lip portion than a middle between the lip portions, the cup seal may be such that a back side of the base portion is made to incline towards a distal end of the outer circumferential lip portion.

DETAILED DESCRIPTION OF THE PREFERRED EMBODIMENTS

Figure 1:
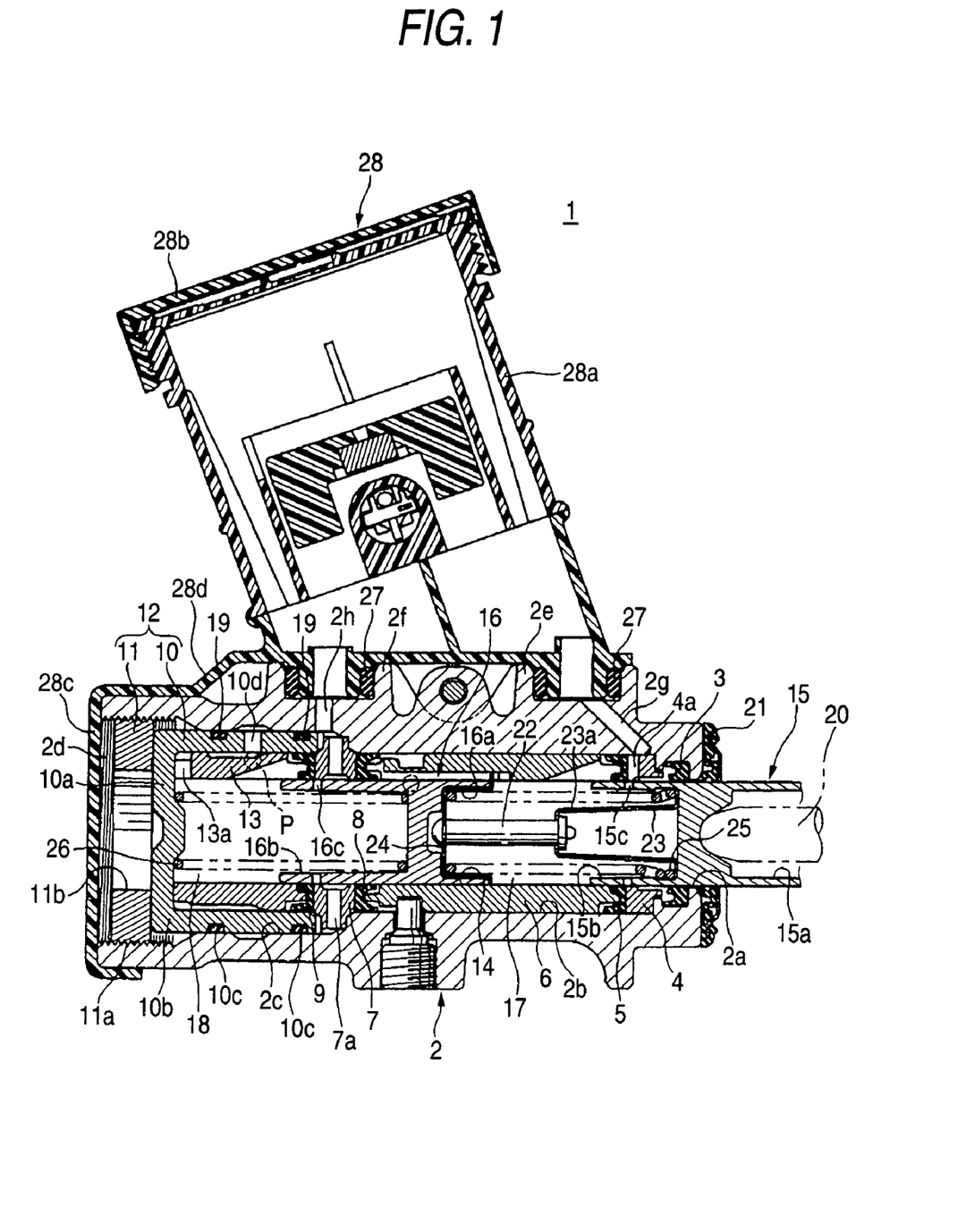
FIG. 1 is a cross-sectional view of a plunger master cylinder showing one embodiment of the present invention.

An embodiment of the present invention will be described below based on the accompanying drawings. FIG. 1 is a cross-sectional view of a plunger-type hydraulic master cylinder for vehicle, in which a cylinder main body 2 of a master cylinder 1 is formed into a cylindrical shape which is made to open at both ends thereof and which includes a distal end small diameter portion 2a which is formed at a front thereof, a small diameter bore 2b which is slightly larger in diameter than the distal end small diameter portion 2a and an intermediate diameter bore 2c and a large diameter bore 2d which are formed at a rear of the cylinder main body. A primary cup seal 3 is mounted in an engagement groove at the distal end small diameter portion 2a, and a secondary cup seal 5 which is supported on a seal support body 4 and a primary piston guide 6 are mounted in the small diameter bore 2b. A seal support member 7 is mounted between the small diameter bore 2b and the intermediate diameter bore 2c, and a tertiary cup seal 8 and a quaternary cup seal 9 are supported on both sides of the seal support member 7. A lid member 12 made up of a sleeve 10 and a plug 11 is mounted in the intermediate diameter bore 2c and the large diameter bore 2d. A secondary piston guide 13 is mounted in an interior of the sleeve 10, and a cylinder bore 14 is formed by the distal end small diameter portion 2a, the seal support body 4, the primary piston guide 6, the seal support member 7, the secondary piston guide 13 and a bottom wall 10a of the sleeve 10.

A primary piston 15 and a secondary piston 16 are inserted into an interior of the cylinder bore 14, a primary hydraulic pressure chamber 17 is defined between these pistons 15, 16, and a secondary hydraulic pressure chamber 18 is defined between the secondary piston 16 and the sleeve 10, respectively.

Figure 2:
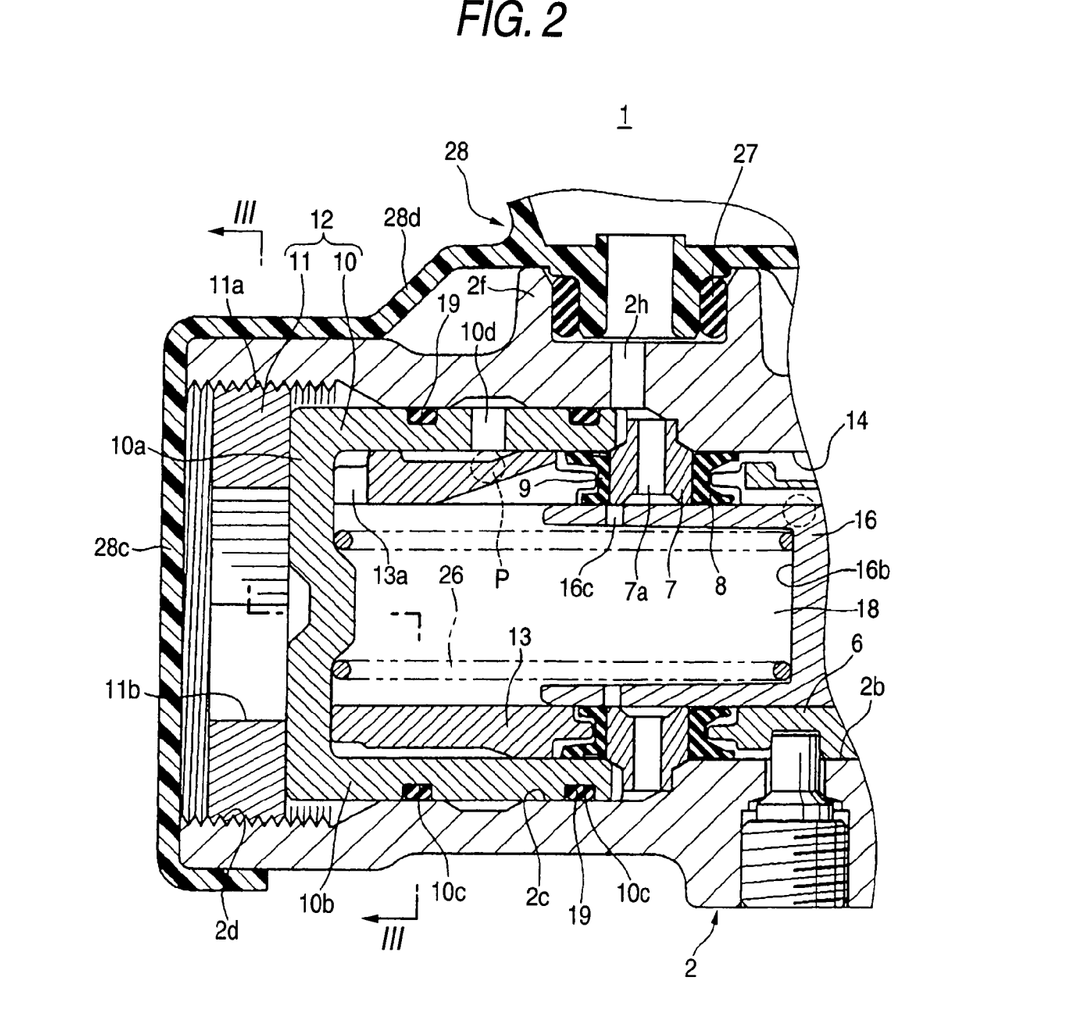
FIG. 2 is an enlarged cross-sectional view of a main part of the plunger master cylinder showing the embodiment of the present invention.
Figure 3:
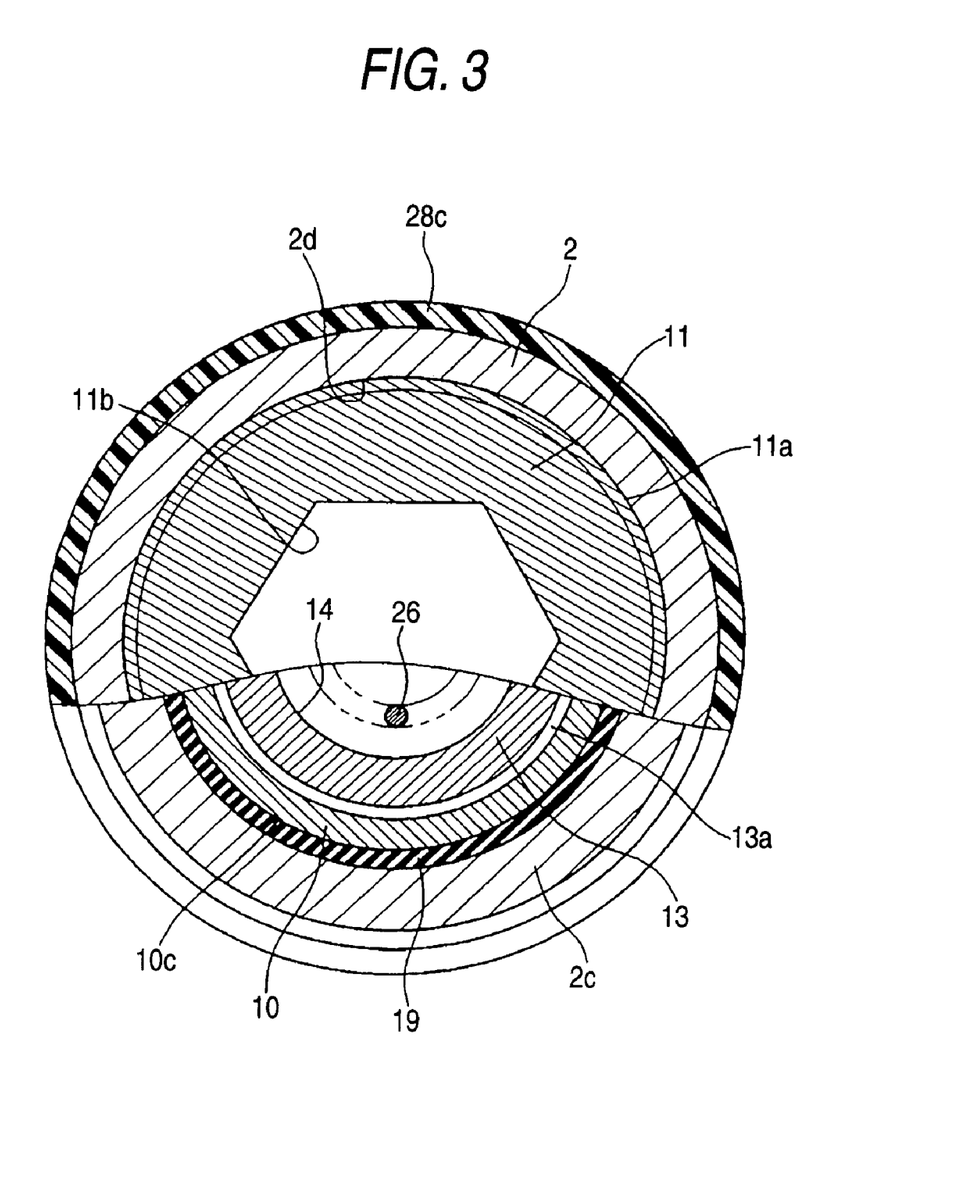
FIG. 3 is a cross-sectional view taken along the line III—III in FIG. 2.

The sleeve 10 is formed into a bottomed cylindrical shape having a circumferential wall 10b and the bottom wall 10a, circumferential grooves 10c, 10c are formed at an open end and a bottom wall end of the circumferential wall 10b, and O rings 19, 19 (a seal ring according to the present invention) of the same diameter are mounted in the circumferential grooves 10c, 10c, respectively. In addition, an output port 10d is bored or opened in the circumferential wall 10b between the circumferential grooves 10c, 10c in such a manner as to communicate with a discharge port P which is opened in the intermediate diameter bore 2c in the cylinder main body 2, whereby a working fluid is supplied to brake devices at wheels, which are not shown, from the discharge port P via the output port 10d.

The plug 11 is a cylindrical body having an externally threaded portion 11a on an outer circumference thereof and a hexagonal hole 11b is opened in a central portion thereof for insertion of a tool. The secondary piston guide 13 which is inserted into the sleeve 10 is formed into a cylindrical shape and includes a cup holder which protrudes into a lip of the quaternary cup seal 9 and a groove portion 13a for forming a fluid passage which connects the secondary hydraulic pressure chamber 18 with the output port 10d.

The sleeve 10 is inserted from the large diameter bore 2d (an opening at one end according to the present invention)

towards the intermediate diameter bore 2c in the cylinder main body 2 with the open end of the sleeve 10 being made to face the interior of the cylinder main body, and the intermediate diameter bore 2c and the sleeve 10 are sealed fluid tightly by the O rings 19, 19. An internally threaded portion 11a is formed in the large diameter bore 2d, whereby the externally threaded portion 11a on the plug 11 is threaded into internal threads in the large diameter bore 2d until an end face of the plug 11 comes into abutment with the bottom wall 10a of the sleeve 10 after the sleeve 10 has been inserted into the cylinder main body 2 so as to prevent the dislocation of the sleeve 10 by the plug 11.

The primary piston 15 is disposed at a distal end of the cylinder bore 14 and the secondary piston 16 is disposed at a rear end thereof. An accommodation bore 15a for a pushrod 20 is formed at a distal end of the primary piston 15, and a large diameter recessed portion 15b is formed at a rear end thereof, whereby the primary piston 15 is accommodated fluid tightly within the cylinder bore 14 by a boot 21 attached to a distal end portion of the cylinder main body 2 and the primary cup seal 3 and the secondary cup seal 5. In addition, a plurality of through holes 15c are opened in a circumferential wall of the primary piston 15 at the rear end thereof where the large diameter recessed portion 15b provided inside, and a retainer 23 for a guide pin 22 which connects the primary piston 15 with the secondary piston 16 is accommodated in an interior of the large diameter recessed portion 15b. The retainer 23 is formed in a glass-like shape having a length which allows the accommodation of the guide pin 22, and a plurality of through holes 23a are opened in a circumferential wall thereof for opening communications between an inside and an outside of the retainer.

A large diameter recessed portion 16a and an intermediate diameter recessed portion 16b are formed at a rear end and a distal end of the secondary piston 16, respectively, whereby the secondary piston 16 is accommodated fluid tightly within the cylinder bore 14 via the tertiary cup seal 8 and the quaternary cup seal 9, and a retainer 24 to which a distal end head portion of the guide pin 22 is fixed is mounted in the large diameter recessed portion 16a. The primary hydraulic pressure chamber 17 is defined between the large diameter recessed portion 15b of the primary piston 15 and the large diameter recessed portion of the secondary piston 16, and a primary return spring 25 is provided between the retainers 23, 24 in a compressed state. A plurality of through holes 16c are opened in a circumferential wall of the secondary piston 16 at the rear end thereof where the intermediate diameter recessed portion 16b is provided inside, the secondary hydraulic pressure chamber is defined between the intermediate diameter recessed portion 16b and the bottom wall 10a of the sleeve 10, and a secondary return spring 26 is provided between the intermediate diameter recessed portion 16b and the bottom wall 10a of the sleeve in a compressed state.

A pair of boss portions 2e, 2f are provided at an upper portion of the cylinder main body in such a manner as to protrude upwardly therefrom, and a reservoir 28 is provided on the boss portions 2e, 2f via grommet seals 27, 27. A pass-fluid hole 2g is opened in the circumferential wall of the cylinder main body 2 at the front thereof in such a manner as to communicate with a bottom wall of the boss portion 2e which is formed toward a front end of the cylinder main body, and a communication hole 4a is opened in the seal support body 4 in such a manner as to communicate with the pass-fluid hole 2g and the interior of the cylinder bore 14, whereby the primary hydraulic pressure chamber 17 communicates with the reservoir 28 via the through holes 15c formed through the primary piston 15, the communication hole 4a and the pass-fluid hole 2g. In addition, a pass-fluid hole 2h is opened in the circumferential wall of the cylinder main body 2 at the rear thereof in such a manner as to communicate with a bottom wall of the boss portion 2f which is formed toward a rear end of the cylinder main body, and a communication hole 7a is opened in the seal support member 7 in such a manner as to communicate with the pass-fluid hole 2h and the interior of the cylinder bore 14, whereby the secondary hydraulic pressure chamber 18 communicates with the reservoir 28 via the through holes 16c formed through the secondary piston 16, the communication hole 7a and the pass-fluid hole 2h.

The reservoir 28 is such as to be formed from a resin and has a reservoir main body 28a having therein a fluid storage chamber for storing a working fluid and a cap 28b which covers an opening in an upper portion of the reservoir main body 28a. A cover member 28c which is detachably placed over the rear end of the cylinder main body 2 where the plug 11 is fixedly threaded inside and a connecting portion 28d which connects the cover member 28c with the cylinder main body 2 are formed integrally on the reservoir main body 28a.

The primary piston 15 and the secondary piston 16 are disposed at positions shown in FIG. 1 by virtue of spring-back forces of the return springs 25, 26 when they are not in operation, and the primary hydraulic pressure chamber 17 and the secondary hydraulic pressure chamber 18 are in communication with the reservoir 28. When in operation, in the event that the pushrod pushes on the primary piston 15, the primary piston 15 moves forward to a bottom portion of the cylinder bore 14 while compressing the primary return spring 25 within the primary hydraulic pressure chamber 17, and at the same time, the secondary piston 16 starts to move forward to the bottom portion of the cylinder bore while compressing the secondary return spring. When the through holes 16c in the secondary piston 16 are closed by the quaternary cup seal 9, the communication between the secondary hydraulic pressure chamber 18 and the reservoir 28 is cut off, whereby a hydraulic pressure is generated within the secondary hydraulic pressure chamber 18. A pressurized working fluid passes from the bottom portion 10a side of the sleeve 10 and is then supplied to the other brake system via the output port 10d in the sleeve 10 and the discharge port P in the cylinder main body 2.

In conjunction with the forward movements, when a set load of the return spring 26 exceeds that of the return spring 25, the primary hydraulic pressure chamber 17 is compressed to thereby generate a hydraulic pressure within the primary hydraulic pressure chamber 17, whereby the hydraulic pressure so generated is then supplied to the remaining brake system. In addition, when the brake pedal is released, the primary piston 15 and the secondary piston 16 are returned to the initial positions thereof by the respective return springs 25, 26.

In the master cylinder 1 according to the present invention, since the lid member 12 is made up of the sleeve 10 and the plug 11, the sleeve 10 provided with the O rings 19, 19 is inserted into the cylinder main body 2, and the plug 11 is fixedly thereafter threaded into the cylinder main body 2, the O rings 19, 19 are prevented from being twisted to be damaged when the lid member is mounted.

In addition, since the hydraulic pressure is equally applied to the O rings 19, 19 of the same diameter which are disposed between the distal end and bottom end of the sleeve 10 by the working fluid which has oozed out from the output port 10d opened in the sleeve 10, a force applied in a bottom wall direction of the sleeve 10 can be decreased. Owing to this, the length of the externally threaded portion 11a of the plug 11 can be decreased, thereby making it possible to suppress the increase in overall length of the cylinder main body 2.

Furthermore, since the outside of the plug 11 is covered with the cover member 28c, even if the plug is loosened, there occurs no risk that the plug 11 is dislocated from the cylinder main body 2. In addition, since the collection of mud and dust in the hexagonal hole 11b formed in an outer wall of the plug 11 can be prevented by the cover member 28c, when being serviced for maintenance, the cover member 28c is removed from the cylinder main body 2, so that a tool can be inserted into the hexagonal hole 11b so as to detach and attach the plug 11 in a simple fashion as required. Furthermore, since the cover member 28c is formed integrally with the reservoir main body 28a, an increase in the number of components can be suppressed, thereby making it possible not only to provide the master cylinder at low costs but also to prevent the components from being lost during servicing for maintenance.

Note that, as has been described in the embodiment, the application of the present invention is not limited to the tandem-type plunger master cylinder but may be applied to a single-type plunger master cylinder, and furthermore, the present invention can be applied to any types of master cylinders other than the plunger master cylinders.

In addition, the seal ring of the present invention is not limited to the O rings which have been described in the aforesaid embodiment, but seal rings in other forms may be used without any problem. Furthermore, the formation of the circumferential groove in which the seal ring is fitted in is not limited to the sleeve, but the circumferential groove may be formed in the circumferential wall of the cylinder bore. Additionally, the cover member which covers the plug may be such as to be formed separately from the reservoir main body.

Figure 7:
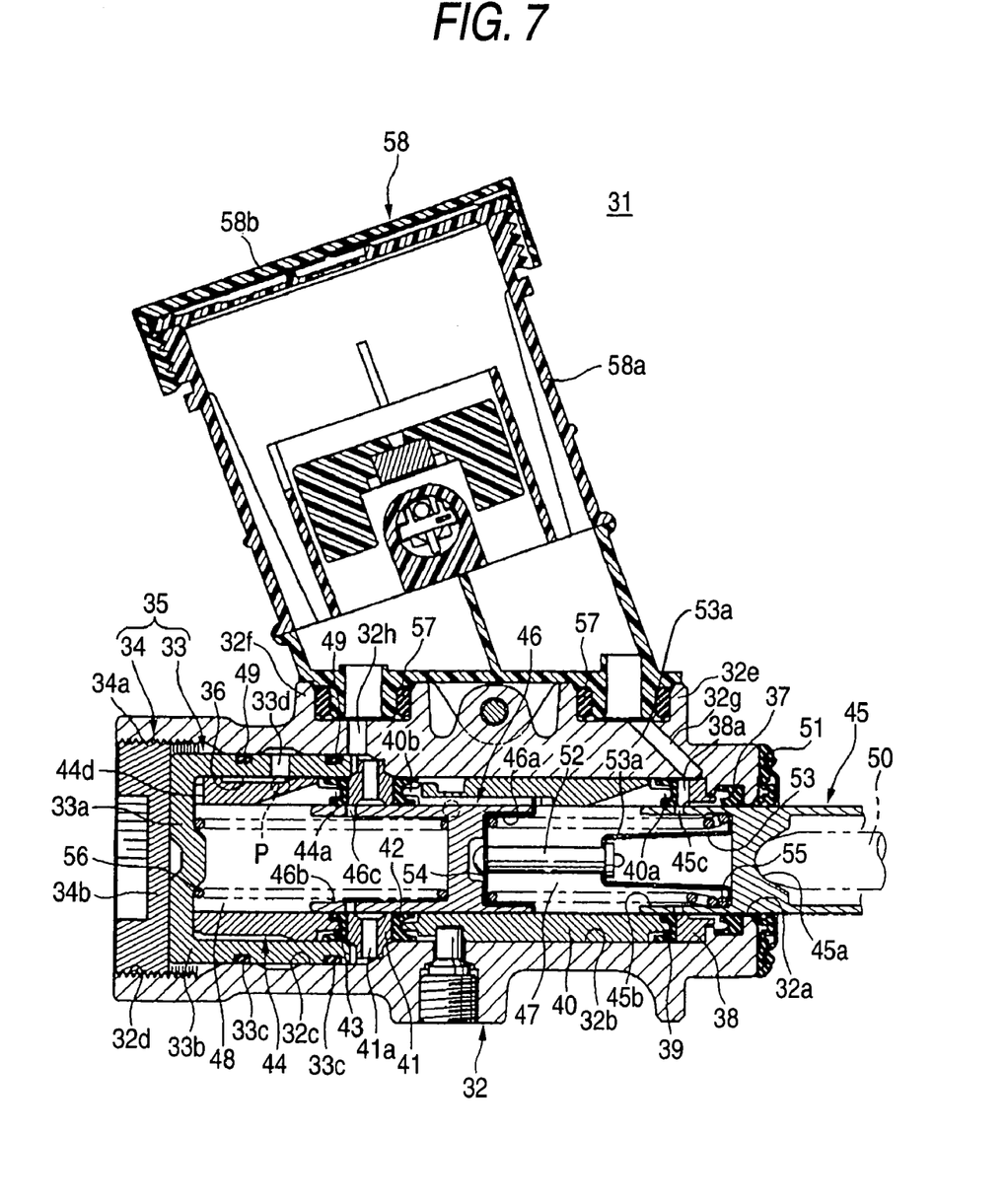
FIG. 7 is a cross-sectional view of a tandem master cylinder according to an embodiment of the present invention.

An embodiment of the present invention will be described in greater detail below based on the accompanying drawings in which embodiment the present invention is applied to a tandem master cylinder. A cylinder main body 32 of a master cylinder 31 is formed into a cylindrical shape which is made to open at both ends thereof and which includes a piston pass-through hole 32a which is formed at a front thereof, a small diameter bore 32b which is slightly larger in diameter than the piston pass-through hole 32a and an intermediate diameter bore 32c and a large diameter bore 32d which are formed at a rear of the cylinder main body. A lid member 35 made up of a sleeve 33 and a plug 34 is mounted in the intermediate diameter bore 32c and the large diameter bore 32d. The sleeve 33 is formed into a bottomed cylindrical shape having a circumferential wall 33b and a bottom wall 33a. The inside diameter of the circumferential wall 33b is made identical to that of the small diameter bore 32b, and a cylinder bore 36 is formed by the circumferential wall 33b of the sleeve 33 and the small diameter bore 32b.

A seal ring 37 is securely fitted in an engagement groove inside the piston pass-through hole 32a, and a primary cup seal 39 supported on a seal support body 38 and a primary piston guide 40 are mounted in the small diameter bore 32b. A seal support member 41 is mounted between the small diameter bore 32b and the intermediate diameter bore 32c, and a secondary cup seal 42 and a tertiary cup seal 43 are supported on both sides of the seal support member 41. A secondary piston guide 44 is mounted in an inner circumference of the circumferential wall 33b of the sleeve 33.

The primary piston guide 40 is formed into a cylindrical shape, has cup holders 40a, 40b at both ends thereof and is displaced between the primary cup seal 39 and the secondary cup seal 42. In addition, the secondary piston guide 44 is also formed into a cylindrical shape, has a cup holder 44a at a seal support member 41 end thereof and is disposed between the tertiary cup seal 43 and the bottom wall 33a of the sleeve 33. A primary piston 45 and a secondary piston 46 are inserted into interiors of the primary piston guide 40 and the secondary piston guide 44, respectively, and a primary hydraulic pressure chamber 47 is defined between these pistons 45, 46 and a secondary hydraulic pressure chamber 48 is defined between the secondary piston 46 and the bottom wall 33a of the sleeve 33, respectively.

Figure 8:
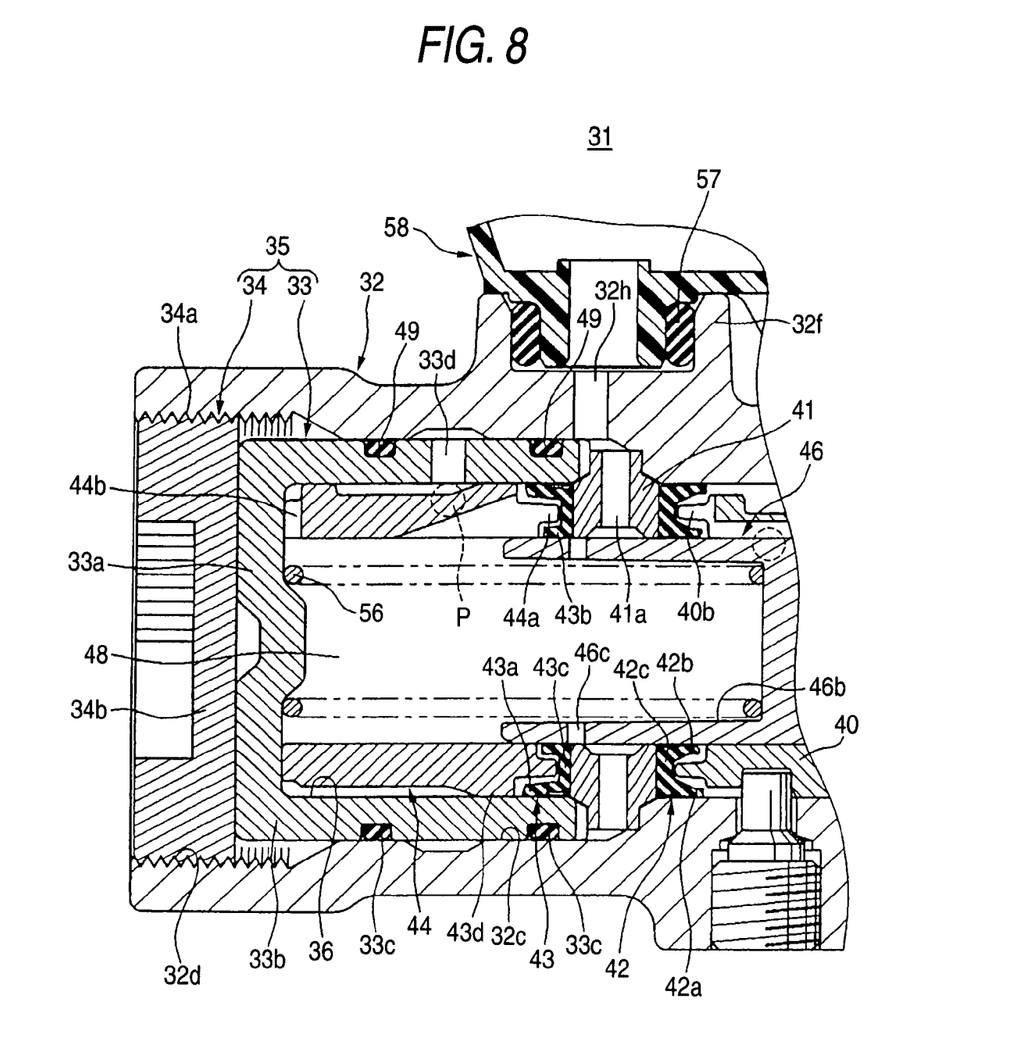
FIG. 8 is an enlarged cross-sectional view of a bottom portion of the same master cylinder.

Circumferential grooves 33c, 33c are formed in an outer circumference of the circumferential wall 33b at an open end and a bottom wall end thereof, and seal rings 49, 49 are securely fitted in the circumferential grooves 33c, 33c, respectively. The sleeve 33 is inserted from the large diameter bore 32d towards the intermediate diameter bore 32c of the cylinder main body 32 with the open end thereof being made to face an interior of the cylinder main body, whereby the intermediate diameter bore 32c and the sleeve 33 are seal fluid tightly by the seal rings 49, 49. In addition, an output port 33d is bored or opened through the circumferential wall 33b between the circumferential grooves 33c, 33c in such a manner as to communicate with a discharge port P opened through the intermediate diameter bore 32c of the cylinder main body 32. A working fluid in the secondary hydraulic pressure chamber 48 is supplied to brake devices of wheels, which are not shown, from a groove portion 44b formed in the second piston guide 44 through the output port 33d and the discharge port P.

The plug 34 is a disc body having an externally threaded portion 34a on an outer circumference thereof and a hexagonal hole 34b is opened in a central portion of an outer surface thereof for insertion of a tool. Internal threads are formed in the large diameter bore 32d, and after the sleeve 33 has been inserted into the cylinder main body 32, the externally threaded portion 34a of the plug 34 is threaded into the internal threads in the large diameter bore 32d until an end face of the plug 34 comes into abutment with the bottom wall 33a of the sleeve 33, whereby the sleeve 33 is prevented from being dislocated by the plug 34.

Figure 4:
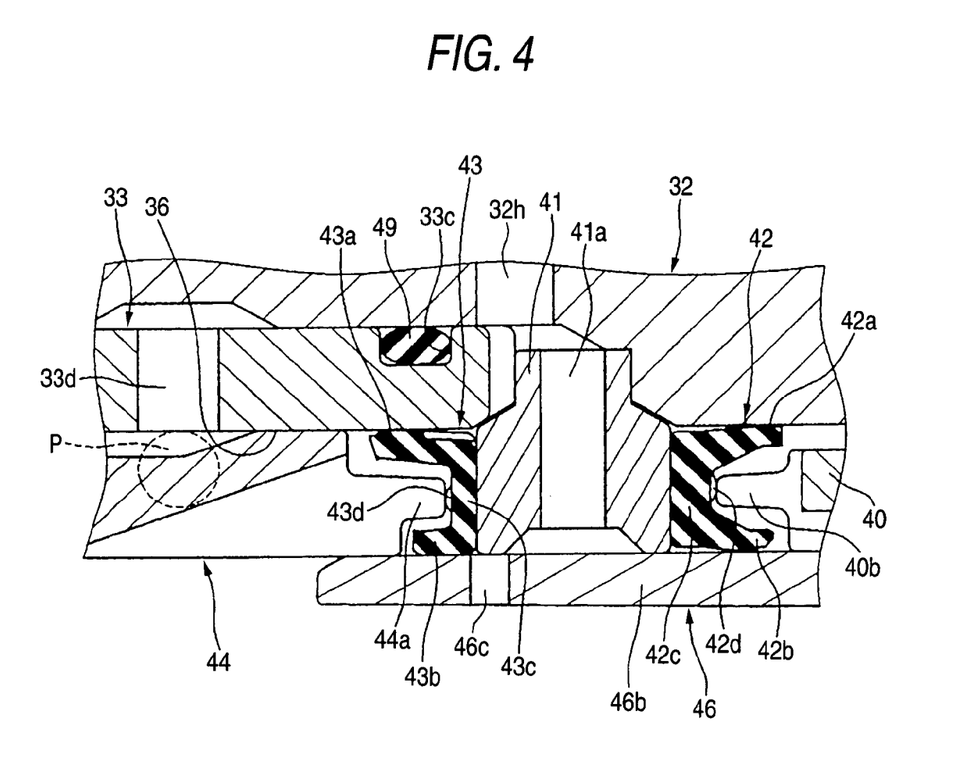
FIG. 4 is an enlarged cross-sectional view showing a state in which cup seals are held.
Figure 5:
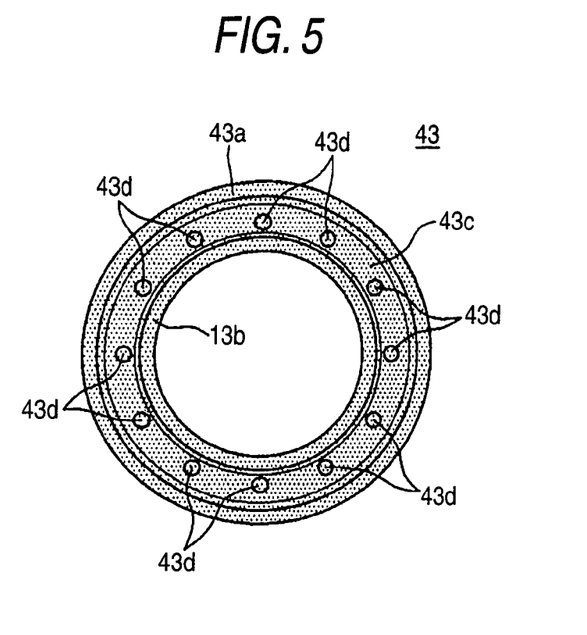
FIG. 5 is a front view of the cup seal.
Figure 6:
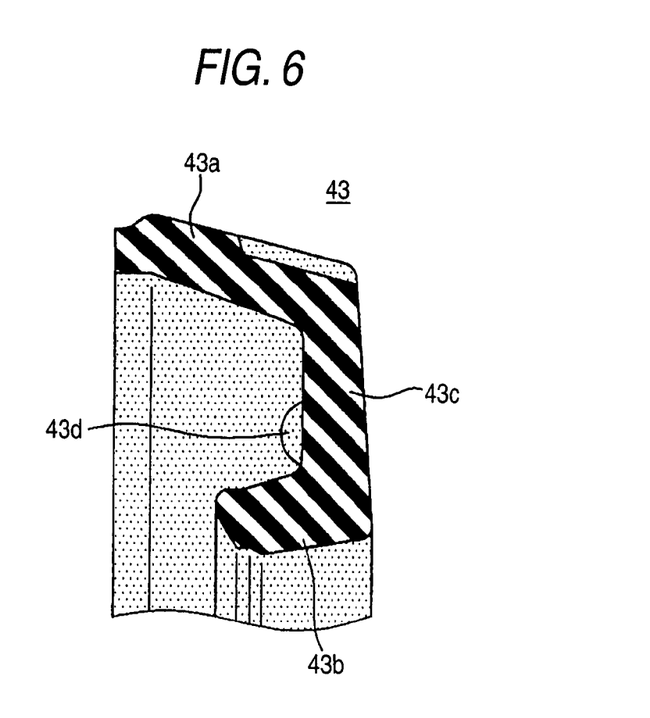
FIG. 6 is an enlarged cross-sectional view showing the configuration of a back side of a base portion of the cup seal.

Since the primary cup seal 39, the secondary cup seal 42 and the tertiary cup seal 43 are constructed substantially identically, the tertiary cup seal 43 shown in FIGS. 4 to 6 will be described as representative of the three cup seals. The tertiary cup seal 43 is formed into an annular shape having an outer circumferential lip portion 43a which is brought into resilient contact with an inner wall of the cylinder bore 36, an inner circumferential lip portion 43b which is brought into resilient contact with an outer wall of the primary piston 45 and a base portion 43c which coupling both the lip portions 43a, 43b together at base portions thereof. As shown in FIG. 5, a plurality of convexly raised portions 43d are formed around the base portion 43c at regular intervals at positions closer to the inner circumferential lip portion 43b than a middle of the both lip portions 43a, 43b in such a manner as to surround circumferentially the circumference of the inner circumferential lip portion 43b. In addition, a back side of the base portion 43c is, as shown in FIG. 6, formed in such a manner as to incline towards a distal end of the outer circumferential lip portion 43a at a predetermined angle as the base portion 43c extends from an inner circumferential end to an outer circumferential end thereof.

The primary cup seal 39 is held in the cylinder bore 36 with a back side of a base portion 9c being brought into abutment with the seal support body 38, both lip portions 39a, 39b being made to face the primary hydraulic pressure chamber 47 and convexly raised portions 39d being brought into abutment with the cup holder 40a of the primary piston guide 40. In addition, the secondary cup seal 42 is held in the cylinder bore 36 with a back side of a base portion 42c being brought into abutment with the seal support member 41, both lip portions 42a, 42b being made to face the primary hydraulic pressure chamber 47 and convexly raised portions 42d being brought into abutment with the cup holder 40b of the primary piston guide 40, and the tertiary cup seal 43 is held in the cylinder bore 36 with the back side of the base portion 43c being brought into abutment with the seal support member 41, the both lip portions 43a, 43b being made to face the secondary hydraulic pressure chamber 48 and the convexly raised portion 43d being brought into abutment with the cup holder 44a of the secondary piston guide 44. The cup holders 40a, 40b, 44a are each formed thinner than a gap between the lip portions so that the deflection of the outer circumferential lip portions 39a, 42a, 43a and inner circumferential lip portions 39b, 42b, 43b of the respective cup seals 39, 42, 43 is not badly affected.

The primary piston 45 is disposed at a distal end of the cylinder bore 36 and the secondary piston 46 is disposed at a rear end thereof, respectively. An accommodation bore 45a for a pushrod 50 is formed at a distal end of the primary piston 45, and a large diameter recessed portion 45b is formed at a rear end thereof, whereby the primary piston 45 is accommodated fluid tightly within the cylinder bore 36 by a boot 51 attached to a distal end portion of the cylinder main body 32, the seal ring 37 and the primary cup seal 39. In addition, a plurality of working fluid supply holes 45c are bored or opened in a circumferential wall of the primary piston 45 at the rear end thereof where the large diameter recessed portion 45b provided inside, and a retainer 53 for a guide pin 52 which connects the primary piston 45 with the secondary piston 46 is accommodated in an interior of the large diameter recessed portion 45b. The retainer 53 is formed in a glass-like shape having a length which allows the accommodation of the guide pin 52, and a plurality of through holes 53a are opened in a circumferential wall thereof for opening communications between an inside and an outside of the retainer.

A large diameter recessed portion 46a and an intermediate diameter recessed portion 46b are formed at a rear end and a distal end of the secondary piston 46, respectively, whereby the secondary piston 46 is accommodated fluid tightly within the cylinder bore 36 via the secondary cup seal 42 and the tertiary cup seal 43, and a retainer 54 to which a distal end head portion of the guide pin 52 is fixed is mounted in the large diameter recessed portion 46a. The primary hydraulic pressure chamber 47 is defined between the large diameter recessed portion 45b of the primary piston 45 and the large diameter recessed portion 46a of the secondary piston 46, and a primary return spring 55 is provided between the retainers 53, 54 in a compressed state. A plurality of working fluid supply holes 46c are opened in a circumferential wall of the secondary piston 46 at the rear end thereof where the intermediate diameter recessed portion 46b is provided inside, the secondary hydraulic pressure chamber 48 is defined between the intermediate diameter recessed portion 46b and the bottom wall 33a of the sleeve 33, and a secondary return spring 56 is provided between the intermediate diameter recessed portion 46b and the bottom wall 33a of the sleeve 33 in a compressed state.

A pair of boss portions 32e, 32f are provided at an upper portion of the cylinder main body 32 in such a manner as to protrude upwardly therefrom, and a reservoir 58 is provided on the boss portions 32e, 32f via grommet seals 57, 57. A pass-fluid hole 32g is opened in the circumferential wall of the cylinder main body 32 at the front thereof in such a manner as to communicate with a bottom wall of the boss portion 2e which is formed toward a front end of the cylinder main body, and a communication hole 38a is opened in the seal support body 38 in such a manner as to communicate with the pass-fluid hole 32g and the interior of the cylinder bore 36, whereby the primary hydraulic pressure chamber 47 communicates with the reservoir 58 via the working fluid supply holes 45c formed through the primary piston 45, the communication hole 38a and the pass-fluid 32g. In addition, a pass-fluid hole 32h is opened in the circumferential wall of the cylinder main body 32 at the rear thereof in such a manner as to communicate with a bottom wall of the boss portion 32f which is formed toward a rear end of the cylinder main body, and a communication hole 41a is opened in the seal support member 41 in such a manner as to communicate with the pass-fluid hole 32h and the interior of the cylinder bore 36, whereby the secondary hydraulic pressure chamber 48 communicates with the reservoir 58 via the working fluid supply holes 46c formed through the secondary piston 46, the communication hole 41a and the pass-fluid hole 32h. The reservoir 58 is such as to be formed from a resin and has a reservoir main body 58a having therein a fluid storage chamber for storing a working fluid and a cap 58b which covers an opening in an upper portion of the reservoir main body 58a.

The primary piston 45 and the secondary piston 46 are disposed at positions shown in FIG. 7 by virtue of spring-back forces of the return springs 55, 56 when they are not in operation, and the primary hydraulic pressure chamber 47 and the secondary hydraulic pressure chamber 48 are in communication with the reservoir 58. When in operation, in the event that the pushrod 50 pushes on the primary piston 45, the primary piston 45 and the secondary piston 46 move forward to a bottom portion of the cylinder bore 36 while compressing the secondary return spring 56 within the secondary hydraulic pressure chamber 48. In conjunction with the forward movements, the working fluid supply holes 45c in the primary piston 45 are closed by the inner circumferential lip portion 39b of the primary cup seal 39, whereby the communication between the primary hydraulic pressure chamber 47 and the reservoir 58 is cut off, and at the same time, the working fluid supply holes 46c in the secondary piston 46 are closed by the inner circumferential lip portion 43b of the tertiary cup seal 43, whereby the communication between the secondary hydraulic pressure chamber 48 and the reservoir 58 is cut off, and thus, a hydraulic pressure is generated within the secondary hydraulic pressure chamber 48, the hydraulic pressure so generated being thereby supplied to one of brake systems.

In the event that the hydraulic pressure generated within the secondary hydraulic pressure chamber 48 and the spring-back force of the secondary return spring 56 exceed a set load of the primary return spring 55, the primary piston 45 moves forwards to approach a bottom portion of the cylinder bore 36 so as to generate a hydraulic pressure within the primary hydraulic pressure chamber 47, whereby the hydraulic pressure so generated is then supplied to the other brake system. In addition, when the brakes are released, the primary piston 45 and the secondary piston 46 are returned to the initial positions by the respective return springs 55, 56.

When the pressure within the primary fluid pressure chamber 47 is increased, due to the pressure so increased, the outer circumferential lip portions 39a, 42a of the primary cup seal 39 and the secondary cup seal 42 increase their press contact forces against the inner wall of the cylinder bore 36, and the inner circumferential lip portion 42b of the secondary cup seal 42 increases its press contact force against the outer wall of the cylinder bore 36, whereby the primary hydraulic pressure chamber 47 is sealed. As this pressure increase within the primary pressure chamber 47 occurs, since the primary cup seal 39 is held within the cylinder bore 36 with the respective convexly raised portions 39d being in abutment with the cup holder 40a of the primary piston guide 40, there is no risk that the primary cup seal 39 moves in conjunction with the forward movement of the primary piston 45. Consequently, since, in the event that the working fluid supply holes 45c in the primary piston 45 are closed by the inner circumferential lip portion 39b, the pressure within the primary hydraulic pressure chamber 47 is increased, the ineffective stroke of the primary piston 45 is decreased. In addition, since the inner circumferential lip portion 39b increases its press contact force against the outer wall of the primary piston 45 after it has closed the working fluid supply holes 45c in the primary piston 45, there is no risk that the inner circumferential lip portion 39b is bitten into the working fluid supply holes 45c.

When the pressure within the secondary hydraulic pressure chamber 48 is increased, due to the pressure so increased, the outer circumferential lip portion 43a of the tertiary cup seal 43 increases its press contact force against the inner wall of the cylinder bore 36, and the inner circumferential lip portion 43b thereof increases its press contact force against the outer wall of the secondary piston 46, whereby the secondary hydraulic pressure chamber 48 is sealed. Since, when the pressure within the secondary hydraulic pressure chamber 48 is increased, the tertiary cup seal 43 is held within the cylinder bore 36 with the respective convexly raised portions 43d being in abutment with the cup holder 44a of the secondary piston guide 44, there is no risk that the tertiary cup seal 43 is moved as the secondary piston 46 moves forwards, and since the pressure within the secondary hydraulic pressure chamber 48 is increased in the event that the working fluid supply holes 46c in the secondary piston 46 are closed by the inner circumferential lip portion 43b, an ineffective stroke of the secondary piston 46 is decreased. In addition, for the same reason as that with respect to the primary cup seal 39, there is no risk that the inner circumferential lip portion 43b is bitten into the working fluid supply holes 46c.

Next, when the primary piston 45 and the secondary piston 46 are returned to their initial positions with the brakes being released, the internal pressures in the primary hydraulic pressure chamber 47 and the secondary hydraulic pressure chamber 48 are decreased to thereby generate therein something like a negative pressure relative to the working fluid within the reservoir 58, the working fluid within the reservoir 58 deflects both the lip portions 39a, 39b of the primary cup seal 39 and both the lip portions 43a, 43b of the tertiary cup seal 43 (mainly, the outer circumferential lip portions 39a, 43a), whereby the working fluid is supplied into the primary hydraulic pressure 47 and the secondary hydraulic pressure 48. As this occurs, since the primary cup seal 39 and the tertiary cup seal 43 are formed such that the back sides of the base portions 39c, 43c incline towards the distal ends of the outer circumferential lip portions 39a, 43a, both the lip portions are easy to be deflected to thereby ensure the refillability of working fluid.

As has been described heretofore, the seal rings are prevented from being twisted when the lid member is mounted in the cylinder main body so as to improve the durability of the seal rings. In addition, the length of the threaded portion of the lid member which is threaded into the cylinder main body while ensuring the proper mounting of the lid member in the cylinder main body so as to reduce the length of the cylinder main body that is formed. Furthermore, the dislocation of the lid member from the cylinder main body and collection of dust and mud on the lid member can be prevented even if the lid member is loosened.

As has been described heretofore, according to the present invention, since the cup seals do not move in conjunction with the movements of the pistons towards the hydraulic pressure chambers, the ineffective strokes of the pistons can be decreased. In addition, since the cup seals are held within the cylinder bore with the plurality of convexly raised portions being in abutment with the piston guides, there is no risk that the cup seals are deformed. Furthermore, since the back sides of the base portions of the cup seals are made to incline towards the distal ends of the outer circumferential lip portions, the lip portions become easy to be deflected so as to improve the refillability of working fluid into the hydraulic pressure chambers when not in operation.

What is claimed is:

1. A hydraulic master cylinder for vehicle comprising:
   a cylinder main body opening at both ends thereof and including a discharge port;
   a bottomed cylindrical sleeve inserted into the cylinder main body and including an outlet port for a working fluid communicating with the discharge port;
   a plurality of seal rings for sealing a periphery of the outlet port fluid tightly;
   a plug having a threaded portion on an outer circumference thereof and abutting with the sleeve, a lid member comprising the sleeve and the plug, and mounted via the seal rings in an opening at one end of the cylinder main body so as to form a bottomed cylinder bore; and
   a piston inserted into the cylinder bore so as to form a hydraulic pressure chamber between the piston and the lid member;
   wherein the sleeve is inserted into the cylinder main body with an open end thereof being made to face an interior of the cylinder main body so as to dispose the seal rings between a circumferential wall of the cylinder bore and the sleeve and in such a manner that the seal rings hold the outlet port therebetween, and the plug is fixedly threaded in the opening at the one end so as to prevent the dislocation of the sleeve.

2. A hydraulic master cylinder for vehicle as set forth in claim 1, wherein the plurality of seal rings are O rings having the same diameter.

3. A hydraulic master cylinder for vehicle as set forth in claim 2, wherein a cover member for covering the plug is mounted on one end portion of the cylinder main body.

4. A hydraulic master cylinder for vehicle as set forth in claim 3, wherein the cover member is formed integrally with a reservoir mounted on the cylinder main body for storing a working fluid.

5. A hydraulic master cylinder for vehicle as set forth in claim 1, wherein a cover member for covering the plug is mounted on one end portion of the cylinder main body.

6. A hydraulic master cylinder for vehicle as set forth in claim 5, wherein the cover member is formed integrally with a reservoir mounted on the cylinder main body for storing a working fluid.

7. A hydraulic master cylinder for vehicle as set forth in claim 1, wherein a hexagonal hole is opened in a central portion of the plug for insertion of a tool.

8. A hydraulic master cylinder for vehicle as set forth in claim 1, further comprising:
- an annular cup seal disposed within the cylinder bore and having an outer circumferential lip portion resiliently contacting an inner wall of the cylinder bore, an inner circumferential lip portion resiliently contacting an outer wall of a piston and a base portion coupling both the lip portions together at base portions thereof;
- the plurality of raised portions disposed circumferentially on the base portion;
- a piston guide entering a recessed portion between the lip portions of the cup seal;
- wherein the cup seal is held within the cylinder bore with a plurality of raised portions being in abutment with an end face of the piston guide.

9. A hydraulic master cylinder for vehicle as set forth in claim 8, the plurality of raised portions are disposed at positions closer to the inner circumferential lip portion than a middle between the lip portions.

10. A hydraulic master cylinder for vehicle as set forth in claim 8, wherein the cup seal is such that a back side of the base portion is made to incline towards a distal end of the outer circumferential lip portion.

11. A hydraulic master cylinder for vehicle comprising:
- a cylinder main body having a first portion and a second portion having a thread, the second portion being larger than the first portion, the cylinder main body opening at both ends thereof and including a discharge port;
- a lid member, comprising two components including:
  - a sleeve positioned in the first portion of the cylinder main body and including an outlet port for a working fluid communicating with the discharge port;
  - a plug having a threaded portion which threadably engages with the thread of the second portion of the cylinder main body, the plug being in abutment with the sleeve;
- a plurality of seals disposed about the sleeve for sealing a periphery of the outlet port of the sleeve; and
- a piston inserted into a cylinder bore of the cylinder main body so as to form a hydraulic pressure chamber between the piston and the lid member.

12. A hydraulic master cylinder for vehicle as set forth in claim 11, wherein the sleeve is inserted into the cylinder main body with an open end thereof being made to face an interior of the main body so as to dispose the seals between a wall of the cylinder bore and the sleeve and in such a manner that the seals hold the outlet port therebetween, and the plug is fixedly threaded in the opening at the one end so as to prevent the dislocation of the sleeve.

13. A hydraulic master cylinder for vehicle as set forth in claim 11, wherein a cover member is formed integrally with a reservoir mounted on the cylinder main body, the cover covering the plug on one end portion of the cylinder main body.

14. A hydraulic master cylinder for vehicle as set forth in claim 11, wherein the cylinder main body includes:
- a distal end small diameter portion which is formed at a front thereof;
- a small diameter bore which is slightly larger in diameter than the distal end small diameter portion;
- the first portion which is an intermediate diameter bore; and
- the second portion which is a largest diameter bore which is formed at a rear of the cylinder main body.

15. A hydraulic master cylinder for vehicle as set forth in claim 11, wherein the sleeve is formed into a bottomed cylindrical shape having a circumferential wall and a bottom wall, circumferential grooves are formed at opposing sides of the outlet port.

16. A hydraulic master cylinder for vehicle as set forth in claim 15, wherein the seals are disposed about the circumferential grooves and are of a same diameter.

17. A hydraulic master cylinder for vehicle as set forth in claim 11, wherein the seals are disposed in grooves of the sleeve, and the outlet port is positioned between the seals.

18. A hydraulic master cylinder for vehicle comprising:
- a cylinder main body having an opening at both ends thereof and including a discharge port;
- a sleeve positioned within the cylinder main body;
- a plug positioned within the cylinder main body and in abutment with the sleeve;
- a plurality of seals disposed about the sleeve for sealing a periphery of an outlet port of the sleeve;
- a piston inserted into a cylinder bore of the cylinder main body so as to form a hydraulic pressure chamber between the piston and the sleeve; and
- a cover member mounted on one end portion of the cylinder main body for covering the plug, the cover member being formed integrally with a reservoir mounted on the cylinder main body for storing a working fluid.

19. A hydraulic master cylinder for vehicle as set forth in claim 18, wherein the sleeve and the plug comprises a lid member.

* * * * *